United States Patent Office 2,784,237
Patented Mar. 5, 1957

2,784,237

CHLORAL DERIVATIVES AND METHODS FOR THEIR PREPARATION

William F. Bruce, Havertown, Pa., assignor to American Home Products Corporation, New York, N. Y., a corporation of Delaware No Drawing. Application June 16, 1954,
Serial No. 437,271

6 Claims. (Cl. 260—615)

This invention relates to the preparation of new and useful chloralhemiacetals of polyhydric alcohols and more particularly to those of alcohols containing three or more hydroxyl groups per molecule which show useful sedative and hypnotic activity.

Chloral hydrate has been known for many years to have useful sedative and hypnotic activity in both man and animals. Many practitioners have preferred this compound to those of similar utility because of its low order of toxicity and freedom from side effects. However, it suffers from several disadvantages. Firstly, it has an extremely strong and disagreeable taste and odor. Secondly, even when administered in capsule form, in order to hide said taste and odor, it results in eructation and a very unpleasant after-taste. Thirdly, it is irritating to the stomach tissues often causing heartburn, emesis, etc. Finally, because of its relative inactivity, relatively large doses are usually required in order to induce sleep.

The well-established animal anesthetic α-chloralose is a glucose-mono chloral acetal without objectionable taste or odor but this compound has no practical sedative and hypnotic use.

It is therefore the object of my invention to prepare active sedative and hypnotic agents having the relative safety of chloral hydrate that are substantially free from the above disadvantages.

I have accomplished the above objects by preparing several new chloralhemiacetals of polyhydric alcohols having favorable therapeutic properties.

I have found that a mixture of chloral and certain polyhydric alcohols will condense under relatively mild conditions of reaction, to form the hemiacetals. Depending upon the number of equivalents of chloral used, at equilibrium there may be one or more unreacted hydroxyl groups remaining in the molecule. For example, an alcohol having six hydroxyl groups may form the tetra-, penta-, or hexa-chloral hemiacetal, depending upon whether 4, 5 or 6 equivalents or choral were used.

The polyhydric alcohols that I have found to react with chloral and form these desirable compositions are those non-toxic alcohols corresponding to the formula $$R(OH)_n$$

where R represents an alkyl group having from three to six carbon atoms and $n$ represents an integer from 3 to 6; as for example, glycerol, sorbitol, mannitol, pentaerythritol and the like.

The reaction may be illustrated by the following equation:

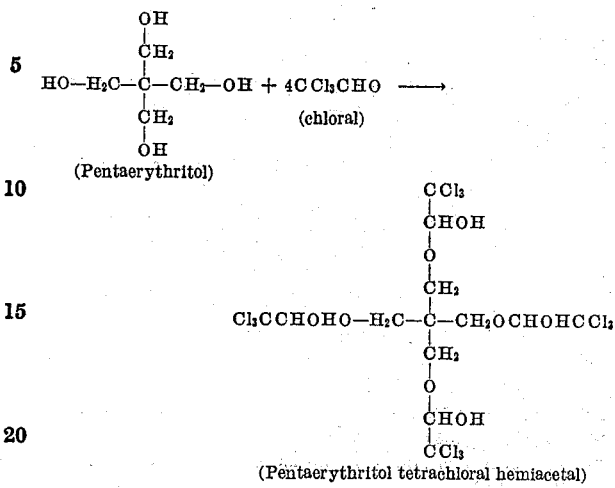

The general formula for the reaction would therefore be

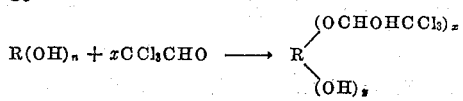

where R represents an alkyl group having from 3 to 6 carbon atoms, $n$ and $x$ each represents an integer from 3 to 6, $y$ being equal to $n-x$.

In general, the reaction is carried out by mixing the proper number of equivalents of anhydrous chloral with the polyhydric alcohol and heating the mixture under anhydrous conditions at the temperature of reflux of chloral from the mixture, until the reaction is complete. Since overheating will cause the hemiacetal to break down into the original reactants, minimum reflux temperature is desirable. Completion of the reaction is determined by observation of the reflux rate of chloral. At the start of the reaction chloral refluxes rapidly; but as the reaction proceeds the reflux rate gradually diminishes. When the reaction is complete, equilibrium has been reached and the reflux rate is at a minimum and remains constant. This point is hereafter referred to as the "point of constant reflux rate." At this point the mixture may be cooled and the product will appear either as a viscous oil or as hard glass that may be ground to a powder. The product can then be incorporated into suitable dosage forms such as tablets, capsules, suppositories and the like with the proper carriers, binders and excipients.

As previously indicated, the number of chloral hemiacetal groups in a molecule is determined by the amount of chloral used; for example, by using four equivalents of chloral, the tetrachloral hemiacetals of mannitol and sorbitol are formed; and using six equivalents of chloral results in the formation of the hexachloral compounds. Similarly, the mono-, di-, tri-, or tetra chloral hemiacetals of pentaerythritol and the tri-chloral hemiacetal of glycerol may be formed.

All of the above compounds show good sedative and hypnotic activity but surprisingly outstanding is pentaerythritol tetra chloral hemiacetal which is remarkably free of the characteristic taste and odor of chloral and which shows sedative and hypnotic activity in humans approximately four times that of chloral hydrate. This greatly increased activity cannot be attributed to the activity of chloral that would be liberated by breakdown of the hemiacetal in the body but must be due to the activity of the hemiacetal itself.

The following examples are presented in order to point out more clearly the method of carrying out the invention but are not intended to limit its scope beyond that indicated in the claims.

*Example I.—Pentaerythritol tetrachloral hemiacetal*

A mixture of 1 mole of pentaerythritol and 4 moles of chloral was refluxed under anhydrous conditions on an oil bath at about 140° C. until the point of constant reflux rate (about 3 hours). Upon cooling, the product was a light yellow glass which was easily powdered.

*Analysis.*—Calculated for $C_{13}H_{16}Cl_{12}O_8$: C 21.6%, H 2.2%, Cl 58.6%. Found: C 21.5%, H 2.6%, Cl 57.2%.

Soluble to about 30 or more gm./100 ml. in ethyl acetate, formamide, ethanol, chloroform, benzene.

Soluble to about 5 gm./100 ml. in tetrachlorethylene and isopropanol. Relatively insolube in cyclohexane and petroleum ether. M. P. 52–54° C.

*Example II.—Mannitol tetrachloral hemiacetal*

A mixture of 0.05 mole of mannitol and 0.2 mole of chloral was refluxed under anhydrous conditions on an oil bath at about 120–130° C. until the point of constant reflux rate (about 5 hours). Upon cooling the product was a hard glassy material which powders easily but quickly becomes sticky in moist air. M. P. (in sealed tube) 49–53° C.

*Analysis.*—Calculated for $C_{14}H_{18}O_{10}Cl_{12}$: C 21.8%, H 2.34%, Cl 55.2%. Found: C 22.0%, H 2.58%, Cl 53.4%.

Soluble in benzene.

*Example III.—Sorbitol tetrachloral hemiacetal*

A mixture of 0.05 mole of sorbitol and 0.2 mole of chloral was refluxed under anhydrous conditions on an oil bath at about 130–140° C. until the point of constant reflux rate (about 5 hours). Upon cooling the product was a hard glassy material which powders easily but in moist air quickly becomes sticky. M. P. (in sealed tube) 69–71° C.

*Analysis.*—Calculated for $C_{14}H_{18}O_{10}Cl_{12}$: C 21.8%, H 2.34%, Cl 55.2%. Found: C 22.6%, H 2.18%, Cl 53.4%.

Soluble in benzene.

*Example IV.—Mannitol hexachloral hemiacetal*

A mixture of 0.05 mole of mannitol and 0.3 mole of chloral was refluxed under anhydrous conditions on an oil bath at about 120–130° C. until the point of constant reflux rate (about 5 hours). Upon cooling the product was a hard glassy material which powders easily but becomes sticky on exposure to moist air. M. P. (in sealed tube) 60–64° C.

*Analysis.*—Calculated for $C_{18}H_{20}O_{12}Cl_{18}$: C 20.4%, H 1.89%, Cl 59.7%. Found: C 21.3%, H 2.27%, Cl 57.8%.

Soluble in benzene.

*Example V.—Sorbitol hexachloral hemiacetal*

A mixture of 0.05 mole of sorbitol and 0.3 mole of chloral was refluxed under anhydrous conditions on an oil bath at about 130–140° C. until the point of constant reflux rate (about 5 hours). Upon cooling the product was a hard glassy material which powders easily but becomes sticky on exposure to moist air. M. P. (in sealed tube) 60–64° C.

*Analysis.*—Calculated for $C_{18}H_{20}O_{12}Cl_{18}$: C 20.4%, H 1.89%, Cl 59.7%. Found: C 21.07%, H 2.39%, Cl 57.6%.

Soluble in benzene.

*Example VI.—Glycerol trichloral hemiacetal*

A mixture of 0.1 mole of dry glycerol and 0.3 mole of chloral were mixed with an immediate evolution of heat. Upon cooling the product is an extremely viscous liquid. Refractive index: $n_D^{25}$ 1.5172.

*Analysis.*—Calculated for $C_9H_{11}Cl_9O_6$: C 20.2%, H 2.07%, Cl 59.8%. Found: C 19.66%, H 2.25%, Cl 60.6%.

Insoluble in benzene.

*Example VII.—Pentaerythritol trichloral hemiacetal*

A mixture of 0.2 mole of pentaerythritol and 0.6 mole of chloral was refluxed under anhydrous conditions on an oil bath at about 120° C. until the point of constant reflux rate (about 5 hours). Upon cooling the product was a hard glassy material which powders easily. M. P. 50–52° C.

*Analysis.*—Calculated for $C_{11}H_{15}Cl_9O_7$: C 22.8%, H 2.59%, Cl 55.2%. Found: C 23.71%, H 2.82%, Cl 52.6%.

Soluble in benzene, ethyl acetate, chloroform, ether, methanol, hot water, hot carbon tetrachloride.

Insoluble in petroleum ether, carbon disulfide.

I claim:

1. A member selected from the group consisting of pentaerythritol tetrachloral hemiacetal and pentaerythritol trichloral hemiacetal.

2. Pentaerythritol tetrachloral hemiacetal.

3. Pentaerythritol trichloral hemiacetal.

4. The method of preparing a member selected from the group consisting of pentaerythritol tetrachloral hemiacetal and pentaerythritol trichloral hemiacetal comprising heating a mixture of pentaerythritol and $n$ equivalents of chloral, where $n$ is equal to 3 in the case of the trichloral hemiacetal and 4 in the case of the tetrachloral hemiacetal, under anhydrous conditions at the temperature of reflux of chloral from the mixture until the point of constant reflux rate is reached and then cooling the mixture.

5. The method of preparing pentaerythritol tetrachloral hemiacetal comprising heating a mixture of pentaerythritol and four equivalents of chloral under anhydrous conditions at the temperature of reflux of chloral from the mixture until the point of constant reflux rate is reached and then cooling the mixture.

6. The method of preparing pentaerythritol trichloral hemiacetal comprising heating a mixture of pentaerythritol and three equivalents of chloral under anhydrous conditions at the temperature of reflux of chloral from the mixture until the point of constant reflux rate is reached and then cooling the mixture.

References Cited in the file of this patent

UNITED STATES PATENTS 2,245,260   Dickey et al. _____ June 10, 1941

OTHER REFERENCES

Meldrum et al.: Chemical Abstracts, vol. 30, 1936 col. 4815–6.

U. S. Dispensatory, 24th ed. (1947), p. 1399.